(12) United States Patent
Chandler-Bradley et al.

(10) Patent No.: US 12,561,671 B1
(45) Date of Patent: Feb. 24, 2026

(54) DIGITAL CURRENCY INFRASTRUCTURE

(71) Applicant: United Services Automobile Association (USAA), San Antonio, TX (US)

(72) Inventors: Jennifer Marie Chandler-Bradley, Tampa, FL (US); Joel S. Hartshorn, Port Orchard, WA (US); Roberto Virgillio Jolliffe, San Antonio, TX (US); Belinda Luna-Pulido, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 20 days.

(21) Appl. No.: 18/193,353

(22) Filed: Mar. 30, 2023

Related U.S. Application Data

(60) Provisional application No. 63/325,965, filed on Mar. 31, 2022.

(51) Int. Cl.
| | |
|---|---|
| *G06Q 20/36* | (2012.01) |
| *G06Q 20/38* | (2012.01) |
| *G06Q 40/03* | (2023.01) |
| *G06Q 40/04* | (2012.01) |

(52) U.S. Cl.
CPC .......... *G06Q 20/36* (2013.01); *G06Q 20/389* (2013.01); *G06Q 40/03* (2023.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 6,606,744 B1 * | 8/2003 | Mikurak | .................. | H04L 9/40 |
| | | | | 717/174 |
| 9,397,985 B1 * | 7/2016 | Seger, II | ............. | H04L 63/0442 |
| 10,762,506 B1 * | 9/2020 | Cash | .................... | G06Q 20/206 |

(Continued)

FOREIGN PATENT DOCUMENTS

| | | | | |
|---|---|---|---|---|
| WO | WO-2018044951 A1 * | 3/2018 | ............. | G06Q 20/06 |
| WO | WO-2020094875 A1 * | 5/2020 | .......... | G06Q 20/027 |
| WO | WO-2022001549 A1 * | 1/2022 | ............. | G06F 21/64 |

OTHER PUBLICATIONS

Bank for International Settlements. "Central bank digital currencies." (Mar. 2018). Retrieved online Dec. 12, 2024. https://www.bis.org/cpmi/publ/d174.pdf (Year: 2018).*

(Continued)

*Primary Examiner* — James A Reagan
(74) *Attorney, Agent, or Firm* — Fletcher Yoder, P.C.

(57) ABSTRACT

Aspects of integrating digital currency usage into financial transaction systems and infrastructure are discussed herein. Such contemplated systems and infrastructure may facilitate the use and/or adoption of digital currency in a variety of contexts. By way of example, in certain embodiments a digital currency infrastructure may be provided that facilitates the acquisition of one or more digital currencies and/or the acceptance of such currencies in a transaction. In other aspects the digital currency infrastructure may include or incorporate the use of a digital currency wallet that enables the access to and use of multiple different types of digital currencies (e.g., cryptocurrencies).

15 Claims, 7 Drawing Sheets

(56) References Cited

U.S. PATENT DOCUMENTS

| | | | | |
|---|---|---|---|---|
| 11,107,157 | B1 * | 8/2021 | Kerof | G06Q 40/03 |
| 11,687,924 | B2 * | 6/2023 | Lingappa | G06Q 20/3825 |
| | | | | 705/71 |
| 2013/0332337 | A1 * | 12/2013 | Tran | G06Q 40/03 |
| | | | | 705/38 |
| 2015/0026072 | A1 * | 1/2015 | Zhou | G06Q 20/401 |
| | | | | 705/41 |
| 2015/0220928 | A1 * | 8/2015 | Allen | G06Q 20/10 |
| | | | | 705/67 |
| 2015/0371224 | A1 * | 12/2015 | Lingappa | G06Q 20/401 |
| | | | | 705/71 |
| 2016/0012465 | A1 * | 1/2016 | Sharp | G06Q 20/321 |
| | | | | 705/14.17 |
| 2016/0306982 | A1 * | 10/2016 | Seger, II | G06F 21/602 |
| 2019/0354518 | A1 * | 11/2019 | Zochowski | G06F 16/2379 |
| 2020/0167756 | A1 * | 5/2020 | Baughman | G06Q 20/3825 |
| 2020/0175506 | A1 * | 6/2020 | Snow | G06Q 20/0655 |
| 2020/0279253 | A1 * | 9/2020 | Ma | G06Q 20/223 |
| 2020/0394714 | A1 * | 12/2020 | Strnad, II | G06Q 40/03 |
| 2021/0056541 | A1 * | 2/2021 | Kim | G06Q 20/3825 |
| 2021/0056620 | A1 * | 2/2021 | Tang | G06Q 20/389 |
| 2021/0157954 | A1 * | 5/2021 | Majko-Ruben | G06F 16/1873 |
| 2021/0233170 | A1 * | 7/2021 | Cadet | G06Q 20/389 |
| 2022/0309511 | A1 * | 9/2022 | Metnick | G06Q 20/401 |
| 2023/0169826 | A1 * | 6/2023 | Higgins | G07F 17/3244 |
| | | | | 463/25 |
| 2023/0214925 | A1 * | 7/2023 | Cella | G06Q 30/06 |
| | | | | 705/37 |
| 2023/0230091 | A1 * | 7/2023 | Vaughn | G06Q 20/4016 |
| | | | | 705/71 |
| 2024/0005290 | A1 * | 1/2024 | Kim | G06Q 10/10 |
| 2024/0005316 | A1 * | 1/2024 | Doney | G06F 21/6209 |
| 2024/0104555 | A1 * | 3/2024 | Biggs | G06Q 40/04 |

OTHER PUBLICATIONS

World Bank Group. "Central Bank Digital Currencies for Cross-Border Payments." (2021). Retrieved online Dec. 12, 2024. https://documents1.worldbank.org/curated/en/369001638871862939/pdf/Central-Bank-Digital-Currencies-for-Cross-border-Payments-A-Review-of-Current-Experiments-and-Ideas.pdf (Year: 2021).*

FATF. "Virtual Currencies." (Jun. 2015). Retrieved online Dec. 12, 2024. https://www.fatf-gafi.org/content/dam/fatf-gafi/guidance/Guidance-RBA-Virtual-Currencies.pdf.coredownload.inline.pdf (Year: 2015).*

* cited by examiner

DIGITAL CURRENCY INFRASTRUCTURE

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital currency, including but not limited to cryptocurrency, has become increasingly prevalent as digital infrastructures continue to expand. Such digital currencies, however, may be subject to unique challenges not typically experienced by non-digital currencies (e.g., tangible or conventional currencies). By way of example, digital currencies may be subject to liquidity issues or constraints in a trading context, such as due to lack of volume, volatility, and/or transactional costs being associated with trading orders. Similarly, activities commonly performed in the context of tangible or conventional currencies may be disrupted, impractical, or otherwise difficult to translate or implement in a digital currency paradigm.

By way of example, conventional banking activities, such as maintaining savings accounts, generation and/or payment of loans, and so forth, may be disrupted by the use of digital currencies, such as due to lack of liquidity, transaction costs, absence of insurance guarantees, and/or volatility associated with such digital currencies. Likewise, conventional transactional partners, such as banking, financial, or insurance institutions, that might typically facilitate currency, banking, or financial transactions may be unable, uninterested, or unwilling to engage in transactions involving digital currencies for the reasons noted herein, while still needing or wanting to provide their services to customers who are interested in using or holding digital currencies.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method is provided for conducting a digital currency transaction. In accordance with this embodiment, a selectable option is displayed on a screen of a user device. The selectable option is an option to round a transaction amount for a transaction in a first currency up to a second amount greater than the transaction amount. Upon receiving an indication of the selection of the selectable option the transaction is completed by authorizing or transferring the transaction amount in the first currency. A remainder amount in a digital currency is also added to a digital currency wallet. The remainder amount is based on a difference between the second amount and the transaction amount.

In a further embodiment, a method is provided for conducting a transaction. In accordance with this embodiment, in response to receiving an indication of a transaction amount for a transaction a selectable option is displayed on a screen of a user device. The selectable option is an option to accept a loan for a transaction amount for a transaction in a first currency. Upon receiving an indication of the selection of the selectable option the transaction is completed by authorizing or transferring the transaction amount in the first currency. Some or all of the first currency used to complete the transaction is derived from the loan.

In another embodiment, a method is provided for conducting a digital currency transaction. In accordance with this embodiment one or both of an indication of a digital currency and a requested amount of the digital currency is received from a first party. The digital currency and the requested amount correspond to a requested transaction. The requested transaction is compared to one or more thresholds. Upon a determination that the one or more thresholds are not exceeded, the digital currency is acquired from a second party and the requested transaction is completed by transferring the digital currency in the requested amount to the first party.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
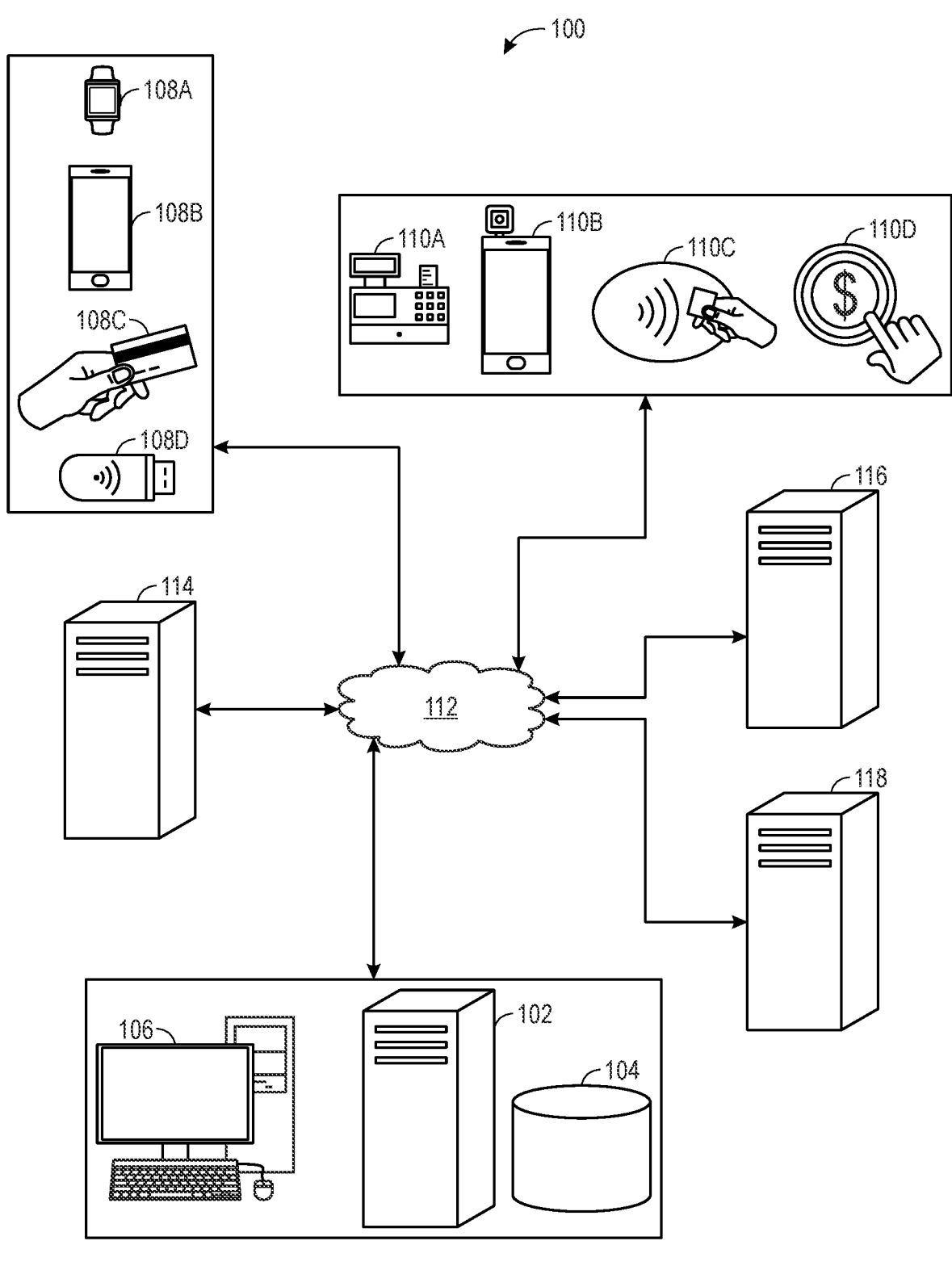
FIG. 1 depicts an illustrative network environment that may function as or otherwise support a digital currency infrastructure, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, a digital currency (or currencies) may be understood to be a currency that exists or is available in only a digital or electronic form (i.e., with no tangible or physical analog). Correspondingly, such digital currencies are only accessible and/or exchangeable via an electronic intermediary, such as a processor-based system that may take the form of a cellular telephone, a table computer, a laptop or portable computer, a desktop computer or workstation, and so forth. By way of example, a digital currency may be, but is not limited to, a cryptocurrency, such as Bitcoin, Ethereum, Ripple, and so forth.

As discussed herein, the adoption of digital currency in various aspects of modern life has been associated with various challenges. Certain challenges may relate to the liquidity issues (e.g., lack of liquidity) related to the purchase, trading, or exchanging of such digital currencies and/or transaction costs that may be associated with such actions. Likewise, volatility among and between such virtual currencies may pose a challenge for adoption or use of such currencies in various financial contexts. Similarly, risks associated with default, lack of insurance protections for assets and deposits (e.g., lack of FDIC-type protection), and a reluctance or regulatory inability for financial entities (e.g., banks, brokerages, insurers, and so forth) to hold or exchange such virtual assets via conventional frameworks may pose challenges for incorporating digital currencies into otherwise conventional financial interactions.

As discussed herein, various aspects of integrating digital currency and its use into financial transaction systems and infrastructure are contemplated herein. Such contemplated systems and infrastructure may facilitate the use and/or adoption of digital currency in a variety of contexts.

By way of example, in certain embodiments discussed herein a digital currency infrastructure may be provided that facilitates the acquisition of one or more digital currencies and/or the acceptance of such currencies in a transaction. In other aspects the digital currency infrastructure may include or incorporate the use of a digital currency wallet that enables the access to and use of multiple different types of digital currencies (e.g., cryptocurrencies). Such a multi-currency wallet (e.g., an "omni-wallet") may facilitate performing transactions and and/or exchanging between different types of digital currency, such as by taking into account exchange rates and/or different transactional costs associated with the different digital currencies. Such an omni-wallet may also allow an associated transaction entity (e.g., financial institution such as a bank, insurer, brokerage firm, and so forth) to determine a suitable level of participation or transactional involvement using rule-based criteria, such as a transaction quantity, volatility of the digital currency, transaction cost, and so forth. Similarly, guidance or notifications (such as advice regarding financial planning, savings, loan opportunities, and so forth) may be provided to a user based on rule-based determinations, such as determination based on transaction or savings amount, loan or credit balances, and so forth.

With the preceding in mind, and by way of introduction to certain aspects that may be employed in a digital currency infrastructure as discussed herein, FIG. 1 depicts certain illustrative components and/or features of a network environment 100 that may be present in a digital currency infrastructure in accordance with certain embodiments. As shown, the illustrative network environment 100 may include a digital transactions server 102, a database 104, a computer terminal 106, user transaction (e.g., digital payment) devices 108a, 108b, 108c, and 108d (collectively or commonly referred to as user devices 108), digital currency transaction devices (e.g., point of sale devices, digital currency automated teller machines (ATMs), and so forth) 110a, 110b, 110c, and 110d (collectively and commonly referred to as 110), a merchant server 114, a financial institution server (e.g., an acquiring bank server) 116, a facilitating server 118, and so forth. It should be understood that these components are merely illustrative and additional or alternative devices may also be present and/or certain of the illustrated devices may be absent, in various embodiments of a digital currency infrastructure as discussed herein.

By way of further example, in certain embodiments the digital transactions server 102 may be one or more processor-based systems (e.g., a suitable computing device or collection of computing devices) that may generate, maintain, or update an omni-wallet or digital currency containing account as discussed herein. The digital transactions server 102 may include, for example, a server computer, a desktop computer, a laptop computer, a tablet computer, and a smartphone. Regardless of the form, the digital transactions server 102 may include a non-transitory storage storing a plurality of computer program instructions and processor executing the plurality of computer program instructions. The non-transitory storage medium may include any form of electronic memory or electronic storage such as random-access memory (RAM) and hard disk drives. The processor may be any kind of processor such as an x86 processor, a MIPS processor, and an ARM processor. The digital transactions server 102 may be also be connected to a database 104. The database 104 may store data records containing information of a plurality of users, a plurality of user devices 108, a plurality of digital currency transaction devices 110, and/or any other entities. The digital transactions server 102 may perform one or more database queries, retrievals, and/or updates for authenticating and/or transacting with each user in the network environment 100. The database 104 may be hosted by a plurality of hardware components such as memory chips, hard disk drives, optically readable devices, and/or any other type of hardware components. It should be understood that although the database 104 is shown separately from the digital transactions server 102, the database 104 may be within the digital transactions server 102.

A computer terminal 106 may be connected to the digital transaction server 102. The computer terminal 106 may allow a system administrator to access the resources and the functionality of the digital transactions server 102. The computer terminal 106 may also allow the system administrator to program/configure the digital transactions server 102 to implement the functionality described throughout this disclosure. The computer terminal 106 may also present an interface for the system administrator to monitor the operation of the digital transactions server 102 and/or perform other ancillary operations associated with a digital currency infrastructure as described herein.

The user devices 108 may be any kind of electronic device that a user may use to access a digital currency wallet or account, such as for transacting with digital currency transaction devices 110, such as to make a purchase, trade or exchange digital currencies, and so forth. Non-limiting examples of user devices 108 may include, but are not limited to, a smartwatch 108*a*, a mobile phone 108*b*, a card 108*c*, and a token device 108*d*. It should however be understood that these are merely illustrative and devices with other form factors and other functionality should be considered within the scope of this disclosure. The smartwatch 108*a* and the mobile phone 108*b* may include a processor for executing instructions, a memory for storing the instructions and the inputs and results respectively utilized by and generated by the processor, and a wireless antenna to communicate with other devices, such as digital currency transaction devices 110. Furthermore, the smartwatch 108*a* and the smartphone 108*b* may communicate through the network 112 to the digital transaction server 102. A card 108*c* on the other hand may not necessarily have a processor though may include a chip-based memory or identifier that may be utilized in digital currency transactions. In certain embodiments, the token device 108*d* may have chip-based functionality (e.g., memory or data storage, pseudo-random number generation capabilities, chip-based authentication or multi-factor authentication, and so forth) that may also be utilized in digital currency transactions.

The digital currency transaction devices 110 may include any kind of processor-based systems (e.g., computing devices) that may facilitate a digital currency based transaction initiated by a user, such as a purchase of goods or services, acquisition of digital currency, exchange of digital currency, and so forth. The digital currency transaction devices 110 may be, for example, at checkout counters of retail stores providing scanning and payment functionality or may be an ATM (e.g., a Bitcoin ATM) similarly configures to interact with a user and user device 108. Non-limiting examples of digital currency transaction devices 110 may include a cash register 110*a* (also referred to as a point of sale (POS) terminal), a mobile phone with a payment dongle 110*b*, a contactless payment device 110*c*, and an online payment gateway 110*d*. In certain embodiments, the digital currency transaction device 110 may communicate with the digital transaction server 102 and/or, as appropriate a merchant server 114.

The network 112 may be any kind of network, including any type of packet switching or circuit switching network. The network 112 may therefore contain any kind of packet switching or circuit switching communication links. These communication links may be either wired or wireless. For example, the network 112 may include packet switching networks such as a local area network (LAN), metropolitan area network (MAN), wide area network (WAN), and the Internet. The network 112 may include or be in communication with ad hoc networks/links such as a Bluetooth communication or a direct wired connection. The network 112 may also include circuit switching network as a telephony network containing wired and/or wireless telephony communication links. Therefore, network of any order of complexity should be considered within the scope this disclosure.

When present, a merchant server 114 may be any kind of suitable processor-based system (e.g., a computing device) that may communicate with the digital currency transaction device(s) 110 through the network 112. In a retail environment, the digital currency transaction device(s) 110 may be within retail stores and a merchant server 114 may track the purchases made through a plurality of digital currency transaction devices 110. The merchant server 114 may also communicate with one or more of digital transactions server 102, an acquiring bank server 116, and/or a facilitating server 118. The acquiring bank server 116 may be a suitable processor-based system (e.g., computing device) that may receive information (e.g., payment or refund information) to be processed from the merchant server 114 through the network 112. The facilitating server 118 may be a suitable processor-based system (e.g., computing device) that may facilitate communication between the acquiring bank server 116 and the digital transactions server 102.

With the preceding digital currency infrastructure discussion in mind, various examples of transactions are described herein that may leverage such an infrastructure to facilitate digital currency transactions, acquisitions, or exchanges. By way of example, a user may engage in the transactions described below in the context of a credit card transaction, a point-of-sale transaction, an ATM (such as a digital currency ATM) transaction, and so forth.

Figure 2:
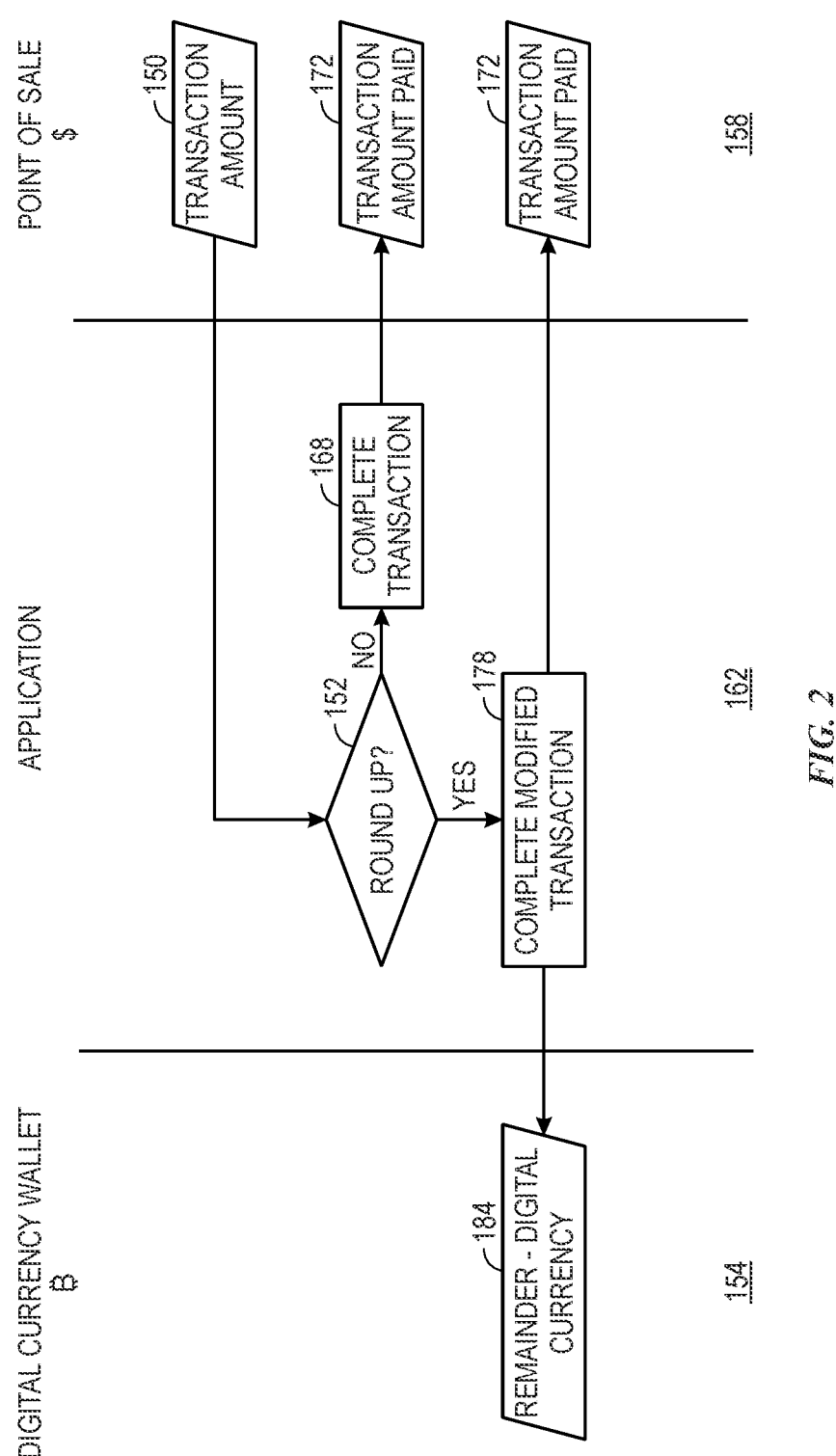
FIG. 2 depicts a process flow of one embodiment related to a digital currency transaction, in accordance with embodiments described herein.

Turning to FIG. 2, in a first example transaction a digital currency user may be engaged in a transaction for which there is an associated transaction amount 150. By way of example, the transaction amount may be sales transaction (e.g., an online or in-person purchase) or other currency-based transaction. In one such implementation the transaction amount may be a fractional amount with respect to a reference currency (e.g., a dollar transaction where the transaction amount is not an even dollar amount, such as $27.68, $15.12, and so forth).

Figure 3:
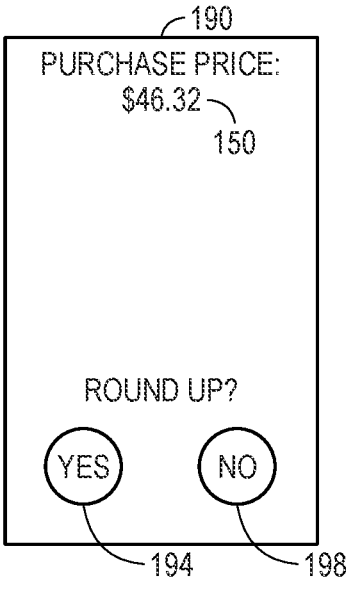
FIG. 3 depicts an example of an application screen that may be displayed on a user device as part of a digital currency transaction, in accordance with embodiments described herein.

In such an example, the user may be provided an option (decision block 152) to "round up" the transaction amount to an even currency amount, such as an even dollar amount. Such a "rounding up" option may be to the nearest even currency amount or to an incremented amount, such as to the nearest even dollar amount, the nearest even five-dollar increment, the nearest even ten-dollar increment, the nearest even twenty-dollar increment, and so forth. By way of example, and turning to FIG. 3, the option may be provided to the user via the screen 190 of a suitable user device 108 (such as a cellular telephone, a smart watch, and so forth) that is used to perform and/or approve the transaction (e.g., purchase), such as via a digital currency wallet 154 stored on or accessible via the user device 108, such as via a suitable financial transaction application 162 or applet (e.g., an application provided or utilized by a financial institution such as a bank, a brokerage, and insurance company, and so forth). In practice, the application 162 may allow interaction with a financial account (e.g., a checking or saving account) or a digital currency wallet 154 associated with the user.

In the depicted example, the transaction amount 150 (here a dollar-based transaction amount at a point-of-sale 158) is displayed by the application 162 in the context of a purchase price on the screen 190. Also displayed on the screen 190 is an option to "round up" the purchase price, which a user can accept or decline via selecting and interacting with respective user selectable features (e.g., touch screen displayed "buttons"), such as a "yes" button 194 or a "no" button 198.

Turning back to FIG. 2 the process flow associated with such an interaction is depicted in accordance with the present example embodiment. In the context where a user declines to round up the transaction amount, the application 162 completes (step 168) or authorizes completion of the transaction such that the transaction amount 172 is paid. Payment of the transaction amount 172 in this context may be out of an account based on the same currency as the transaction (e.g., dollars), such as a savings or checking account, or may be out the digital currency wallet 154 after a suitable exchange is performed between the digital currency (e.g., cryptocurrency) and the transaction currency (e.g., dollars).

Alternatively, if the user opts to round up the transaction amount to an even increment of the currency in which the transaction is denominated, the modified transaction may be completed (step 178) by paying or authorizing payment of the transaction amount 172 at the point of sale 158. As in the preceding context, payment of the transaction amount 172 may be out of an account based on the same currency as the transaction (e.g., dollars), such as a savings or checking account) or may be out the digital currency wallet 154 after a suitable exchange is performed between the digital currency (e.g., cryptocurrency) and the transaction currency (e.g., dollars). In addition, and as shown in FIG. 2, a transaction is also performed depositing or adding an amount of digital currency corresponding to the difference (i.e., remainder 184) between the "rounded up" amount and the transaction amount 172 to the digital currency wallet 154. By way of example, the difference may be determined between the transaction amount 172 and the "rounded up" amount in terms of the currency in which the transaction may be denominated and the equivalent of the difference (as determined based on an ascertainable or pre-determined exchange rate) may be added to the digital currency wallet 154. In this manner, a user may simply, and at their discretion, add funds to the digital currency wallet 154 without making explicit, stand-alone deposit transactions, but instead over the course of performing other transactions not directly related to making such deposits. Such combined transactions may be facilitated or otherwise performed via functionality provided by the application 162, such as an application executing on the user device 108 that may be provided by a financial institution (e.g., bank, brokerage company, insurance company, and so forth) which may or may not directly hold or own the digital currency in question, but nevertheless facilitates transactions for the user in the digital currency either directly or as a third-part transactor.

Figure 4:
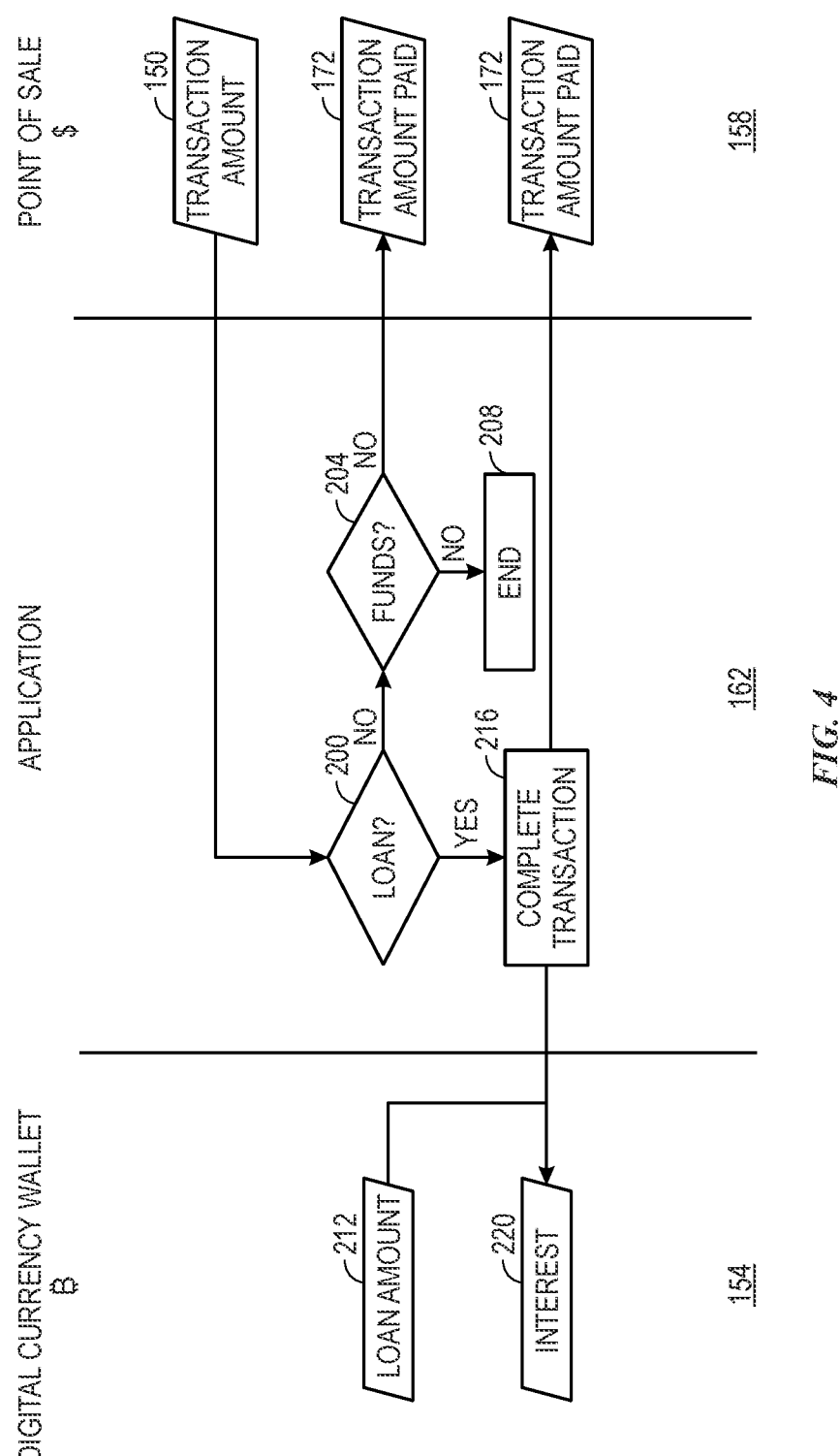
FIG. 4 depicts a process flow of a further embodiment related to a digital currency transaction, in accordance with embodiments described herein.
Figure 5:
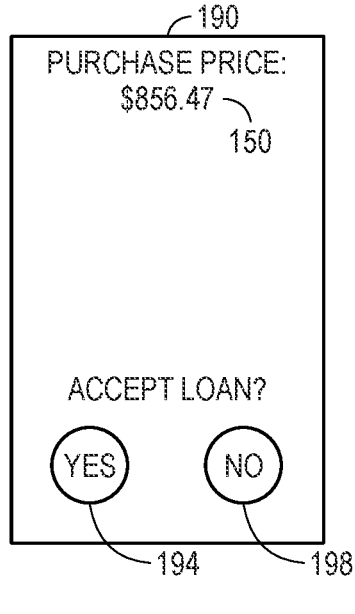
FIG. 5 depicts another example of an application screen that may be displayed on a user device as part of a digital currency transaction, in accordance with embodiments described herein.

Turning to FIG. 4, in a similar context in certain embodiments an option (decision block 200) to receive or take a loan may be provided to the user of the application 162 at the time a transaction is being conducted (e.g., at the point of sale 158). By way of example, and turning to FIG. 5, the option may be provided to the user via the screen 190 of a suitable user device 108 (such as a cellular telephone, a smart watch, and so forth) that is used to perform and/or approve the transaction (e.g., purchase) and which may transact with a digital currency wallet 154 stored on or accessible via the user device 108, such as via a suitable financial transaction application 162 or applet (e.g., an application provided or utilized by a financial institution such as a bank, a brokerage, and insurance company, and so forth). In practice, the application 162 may allow interaction with a financial account (e.g., a checking or saving account) or a digital currency wallet 154 associated with the user. In the depicted example, the transaction amount 150 (here a dollar-based transaction amount at a point-of-sale 158) is displayed by the application 162 in the context of a purchase price on the screen 190. Also displayed on the screen 190 is an option to accept a loan, which a user can accept or decline via selecting and interacting with respective user selectable features (e.g., touch screen displayed "buttons"), such as a "yes" button 194 or a "no" button 198.

Turning back to FIG. 4, in the event the user declines the loan, a further check may be made (decision block 204) to determine whether the user has sufficient funds, either in the digital currency wallet 154 or another linked account (such as an account denominated in the currency of the transaction), to conduct the transaction. If sufficient funds are determined to be available, the transaction amount 172 is paid. If no source having sufficient funds is accessible via the application 162, the transaction may be ended or otherwise concluded (block 208).

In the depicted example, if the decision is made to accept the loan at decision block 200, the user may have access to the loan amount 212, which may be denominated as digital currency (e.g., cryptocurrency) within the digital currency wallet 154 or as a currency in which the transaction is conducted, which instead may be provided within a suitable account (e.g., a checking, brokerage, or savings account) accessible by the application 162. By way of example, and in certain embodiments, such a transaction may benefit from the user device 108, and correspondingly the application 162, being connected at the point of sale 158 (e.g., as an edge computing device, as opposed to having to incorporate a server or back-end processing device into the transaction). That is, the user device 108 and application 162 are connected to the transaction and may thereby facilitate the described interactions.

With this in mind, in the depicted example, upon acceptance of the loan and the subsequent availability of the loan amount 212 (either in the digital currency wallet 154 or another account), the transaction amount 172 is paid to complete (step 216) the transaction. In certain embodiments, and as shown in FIG. 4, other financial aspects related to the acceptance of the loan, such as interest payments, may be associated with the digital currency wallet 154 as appropriate. For example, loan principal and/or interest 220 payments may be paid out of (or, if appropriate, into) the digital currency wallet 154 or another account (e.g., a checking, brokerage, or savings account) accessible by the application 162. By way of example, based on exchange rate between the digital currency of the digital currency wallet 154 and the currency in which the loan is denominated, payments of loan principal or interest 220 may be made either from the digital currency wallet 154 or another suitable account based on whichever is most advantageous. Similarly, in circumstances where interest 220 or other transactional fees are actually owed or due the user, such payments may be made into the digital currency wallet 154, such as based upon an ascertained or predetermined exchange rate if appropriate, so as to further allow the user to add digital currency funds to the digital currency wallet 154 in a straightforward and easy manner.

With respect to the application 162, in various embodiments the application 162 may be configured to provide useful or helpful information to the user so as to facilitate decision making and/or account management. As discussed generally herein, the application 162 may be provided or utilized by a financial institution (such as a bank, a brokerage, insurance company, and so forth) which may or may not directly hold or own the digital currency in question, but nevertheless facilitates transactions for the user in the digital currency either directly or as a third-part transactor.

Figure 6:
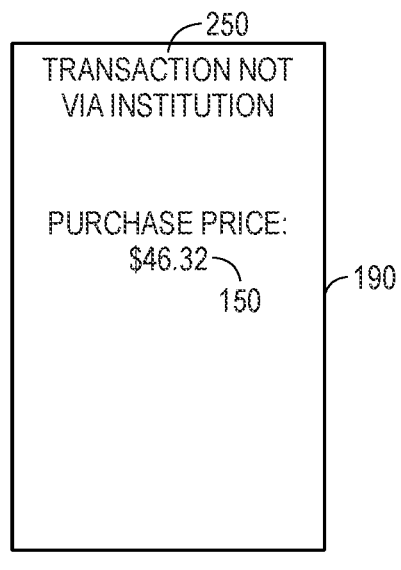
FIG. 6 depicts a further example of an application screen that may be displayed on a user device as part of a digital currency transaction, in accordance with embodiments described herein.
Figure 7:
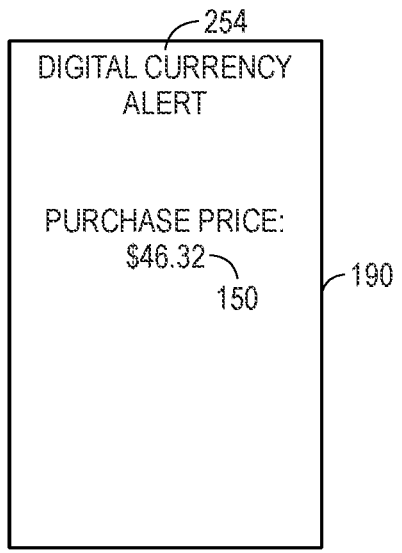
FIG. 7 depicts another example of an application screen that may be displayed on a user device, in accordance with embodiments described herein.

With this in mind, and turning to FIGS. 6 and 7, aspects of the application 162 may be provided for the user's benefit. By way of example, notifications (e.g., a banner notification or other suitable visual or audible notification) may be provided to a user of the application 162 running on a user device 108 so as to convey useful information relevant to a given transaction and/or to the user's digital currency wallet 154. For instance, in the example of FIG. 6 a notification 250 is displayed to convey to the user that one or more aspects of the contemplated transaction are not being conducted by or through the financial institution associated with the application 162. By way of example, in a digital currency (e.g., cryptocurrency) context in which the digital currency in question is being acquired, exchanged, or otherwise transferred, the institution associated with the application may not be a party to such transactions (e.g., may not themselves hold or own the digital currency in question). In such circumstances, the transaction pertaining to the digital currency may be with a third party separate from the institution providing or maintaining the application 162. In such a circumstance, to inform the user that a third party is involved and/or that the institution is not part of the transaction, a notification 250 may be displayed prominently on screen 190 of the user device 108 running the application 162 to inform the user of this circumstance.

In a further example, and turning to FIG. 7, the application 162 may provide other notifications or alerts (visual or audible) to the user to inform or update the user with information relevant to their account(s), such as relevant to the digital currency maintained or accessed via their digital currency wallet 154. By way of example, and as shown in FIG. 7, a notification 254 or other suitable alert may be provided to a user of the application 162 running on a user device 108 so as to convey useful information relevant to a digital currency (e.g., cryptocurrency) held by a user in a digital currency wallet 154 accessible by, or otherwise associated with, the application 162. For instance, in the example of FIG. 7 a notification 254 is displayed to convey to the user that a digital currency owned or of interest to the user has met or exceeded an alert condition. Such conditions may be pre-programmed by the application 162 and/or may be separately configurable by the user and may include, but are not limited to, price or exchange rate changes (i.e., increases or decreases) of a defined magnitude (e.g., a percent or absolute change in an exchange rate for a digital currency relative to a reference currency), volatility changes (i.e., increases or decreases) of a defined magnitude (e.g., a percent or absolute change), trade volume alerts (i.e., low or high volumes) of a defined magnitude (e.g., a percent or absolute volume), quantity or value of a digital currency currently held exceeding a specified threshold, and so forth. By way of example, in a digital currency (e.g., cryptocurrency) context in which the digital currency in question is already owned or held or is being considered for a potential acquisition or trade, such an alert may be set and triggered when a desirable (or undesirable) condition is met. In this manner, a user may be notified that a condition is met to acquire, or sell, a digital currency of interest.

Further, in some circumstances a financial institution, such as an institution associated with the application 162 or supporting the digital currency wallet 154, may monitor a user's activity (e.g., financial activity) and based on observed trends, such as typical deposit trends (e.g., paydays) and current monitored activity, may suggest or facilitate short term transactions, such as loans, based on the observed trends. In some instances such actions may leverage or otherwise incorporate digital currency, such as a digital currency (e.g., cryptocurrency) loan provided to the user into the user's digital currency wallet 154 until the next expected deposit activity (e.g., based on prior trend data). In such circumstances, the institution may charge a flat- or interest-based fee or surcharge to provide the temporary funding. In such a circumstance or context, the financial institution, which may not own or otherwise hold digital currency or the digital currency in question (or may not own or hold the digital currency in a sufficient quantity), acquisitions of the digital currency may be done in a "just-in-time" manner (i.e., acquiring the appropriate amount of the digital currency in question at the time it is needed to fund the user) so as to avoid the institution owning or holding the digital currency for any length of time (or any substantial length of time).

Similarly, the financial institution may choose to offer a financial product (e.g., a checking account, credit card, debit card, and so forth) that functions, wholly or partially, in the realm of one or more digital currencies of interest. For example, such a financial product may be linked to or otherwise associated with a digital currency wallet 154 of the user and/or may offer to the user, when conducting a transaction with the financial product, to ability to conduct the transaction, wholly or in part, in a digital currency (e.g., cryptocurrency). By way of example, the user may conduct a credit or debit transaction in a number of different configurations. For instance, if the transaction is denominated in a non-digital, conventional currency (e.g., dollars), the user may use the financial product to make a credit purchase in which the transaction is performed in the conventional currency, but the credit debt incurred is denominated in a digital currency based on an exchange rate ascertained at the time of the transaction, at another time, or at a pre-determined rate. Alternatively, if the transaction is denominated in a digital currency (e.g., a cryptocurrency), the user may use the financial product to make a credit purchase in which the transaction is performed in the digital currency, but the credit debt incurred is denominated in a conventional currency (e.g., dollars) based on an exchange rate ascertained at the time of the transaction, at another time, or at a pre-determined rate. Further, if the transaction is denominated in a digital currency (e.g., a cryptocurrency), the user may use the financial product to make a credit purchase in which the transaction is performed in the digital currency, with the credit debt incurred being denominated in the same or a different digital currency (e.g., a different cryptocurrency) based on an exchange rate ascertained at the time of the transaction, at another time, or at a pre-determined rate. In such varied contexts, a fee, surcharge or suitable interest rate may be applied to offset transaction costs and/or risks associated with holding one or more digital currencies for the pendency of the credit debt, price or exchange rate fluctuations associated with such digital currencies over such pendency, and/or other intrinsic volatility associated with such digital currency.

Figure 8:
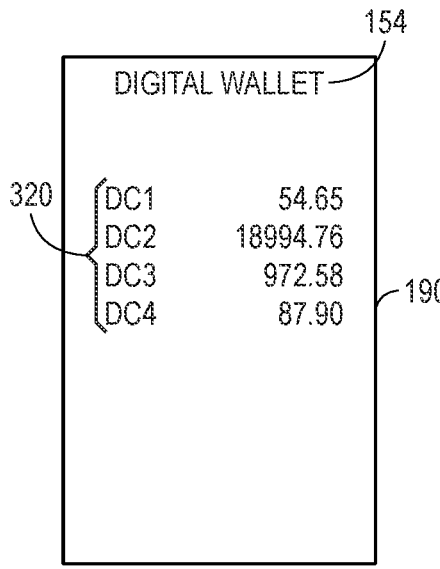
FIG. 8 depicts an example of an application screen that may be displayed on a user device as part accessing or transacting with an omni-wallet, in accordance with embodiments described herein.

With the preceding in mind, and in further view of the digital currency wallet 154 and its use as described herein, it may be appreciated that in certain embodiments the digital currency wallet 154 may be configured to or otherwise capable of accepting or holding multiple types of digital currency, i.e., an omni-wallet. Such an omni-wallet may provide a user with various benefits, such as, but not limited to, the ability to conduct a transaction using digital currency selected from among a plurality of digital currencies in the omni-wallet. In this manner, a user may conduct a transaction using a digital currency in which the transaction is denominated (e.g., making a purchase using a cryptocurrency in which a good or service is priced) or using a digital currency having favorable exchange rate or transactional benefits for the transaction. Similarly, such an omni-wallet may allow a user to, among his or her portfolio of digital currencies, rebalance digital currencies based on a desired digital currency profile or exchange one digital currency for another based on existing exchange rate or market conditions. An example of one such embodiment of a digital currency wallet 154 in the form of an omni-wallet is illustrated in FIG. 8, wherein the digital currency wallet 154 is stored on or accessible via the user device 108, such as via a suitable financial transaction application 162 or applet (e.g., an application provided or utilized by a financial institution such as a bank, a brokerage, and insurance company, and so forth). In the depicted example the digital currency wallet "holds" a plurality of digital currency types 320 (e.g., DC1, DC2, DC3, and so forth).

As discussed herein, such a digital currency wallet 154 (e.g., omni-wallet) may be accessible by an application 162 provided by an institution, but the institution (e.g., financial institution) may not themselves own, hold, or exchange some of all of the digital currencies maintained within a user's digital currency wallet 154. Nevertheless, the institution, via the application 162, may facilitate providing useful digital currency information to the user via the application 162 (e.g., exchange rate, volatility, trade volumes, and so forth) and/or may facilitate transactions (e.g., trades, exchanges, purchases, sells, and so forth) based on the digital currencies held within a given digital currency wallet 154. By way of example, and as noted herein, a user using the application 162 and having access to such a digital currency wallet 154 may exchange or trade digital currencies held within the digital currency wallet 154 based on ascertainable or pre-determined exchange rates.

With the preceding in mind, in certain embodiments a user may want to invest in, or otherwise transact for or with, some quantity of digital currency, such as a cryptocurrency. As noted herein, to the extent that an application 162 and/or digital currency wallet 154 are to be utilized in the transaction, there may be issues related to whether the underlying financial institution supporting the application 162 and/or digital currency wallet 154 holds, owns, or otherwise transacts in the digital currency in question, particularly in view of the currency risks and/or volatility that may be present for a given digital currency.

Figure 9:
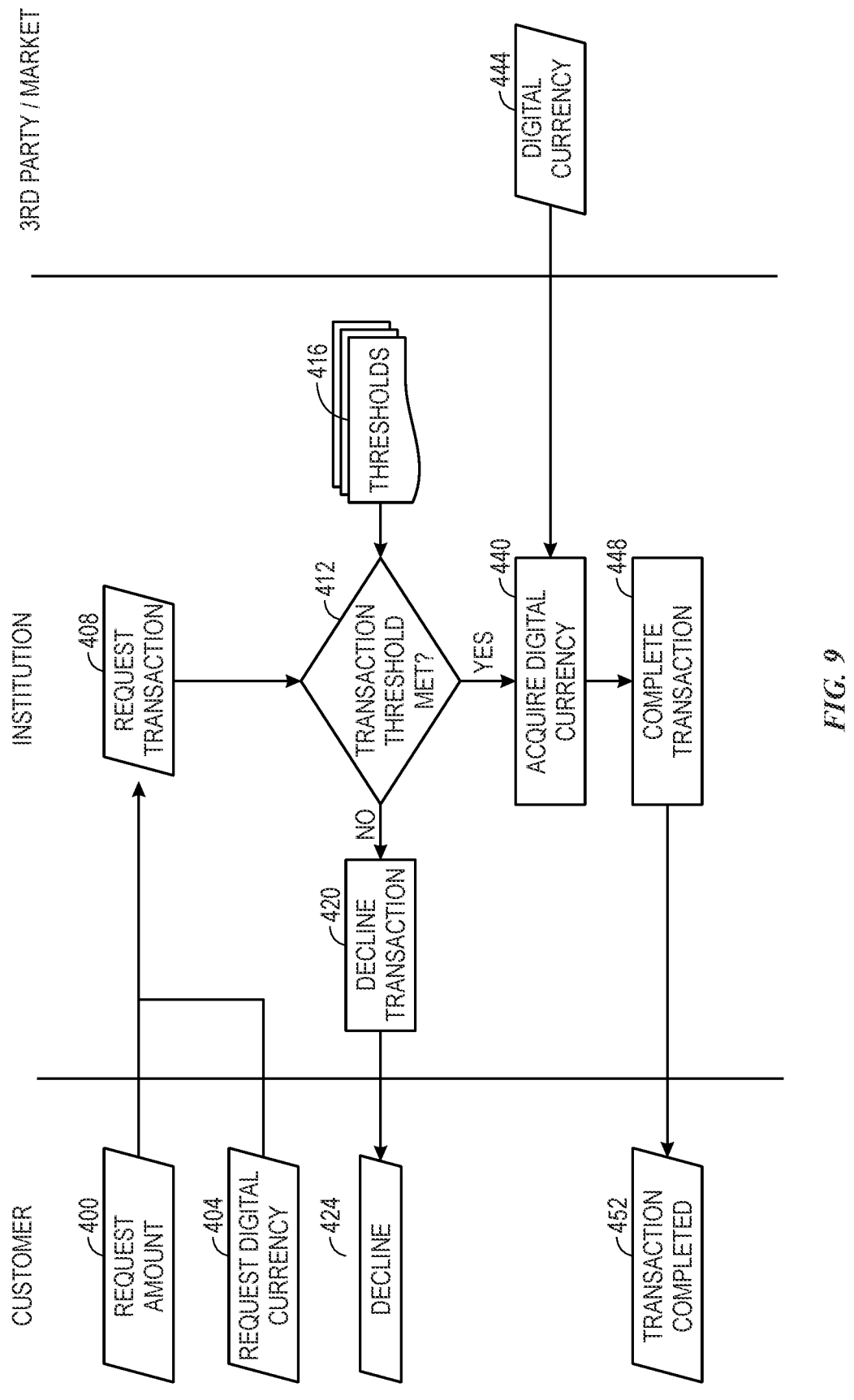
FIG. 9 depicts a process flow of another embodiment related to a digital currency transaction, in accordance with embodiments described herein.

With this in mind, in certain embodiments such a transaction may be facilitated by the use of one or more transaction thresholds, with a given threshold specified or set so as to correspond to a tolerance (e.g., risk tolerance, price tolerance, volatility tolerance, daily or weekly transaction volume tolerance, liquidity tolerance, and so forth) determined by the financial institution for the respective digital currency. An example of one such process flow incorporating the use of one or more thresholds based on such tolerances is shown in FIG. 9. In this example, a customer may request an amount 400 of a digital currency, such as to purchase, exchange, or otherwise transact the digital currency in the requested amount 400. By way of example, the request may be to purchase an amount 400 of a cryptocurrency. In specifying the requested amount 400 and the requested digital currency 404 of interest, the customer of the financial institution may interact with an application 162 and/or a digital currency wallet 154, such as an omni-wallet, as discussed herein.

In practice, the requested amount 400 may correspond to a whole or fractional quantity of a requested digital currency 404 as specified by the customer (e.g., 1, 1.5, 2, 2.5, 5, 10, and so forth units of the requested digital currency 404). Alternatively the requested amount 400 may be derived based on a specified quantity or amount of a non-digital reference or conventional currency (e.g., dollars) to be spent, which can be converted to a requested amount of the requested digital currency 404 based on an exchange rate, e.g., an ascertainable or pre-determined exchange rate. That is, based on an ascertainable or pre-defined exchange rate, a specified quantity or amount of one currency (e.g., a reference or conventional currency) may be used to derive or specify the requested amount 400 of the requested digital currency 404.

When processing the requested transaction 408 the institution, which may own or hold the digital currency or may need to acquire the digital currency for a temporary or extended duration, may make a determination as to whether or not to complete or deny the transaction. In the depicted example, the determination is made, at least in part, based on a comparison (decision block 412) of the requested transaction 408 versus one or more thresholds 416. By way of example, the one or more thresholds may be specific to a respective digital currency and/or specific to a requested transaction amount 400 such that all digital currencies are subject to the same transaction amount threshold or different digital currencies are subject to different transaction amount thresholds. By way of example, a threshold 416 may specify that an acceptable quantity or value of the digital currency to be transacted must be below a specified reference currency value (e.g., at or below $1,000, $500, $250, $100, $50, $20. $10, $5, $1, and so forth). Further, though not shown, other factors such as liquidity, trading volume, volatility, and so forth may also have respective thresholds 416 that may be considered or which may alter or determine thresholds specific to a digital currency or to a threshold acceptable amount for a transaction, as measured in terms of the digital currency or a reference currency. In this manner, a requested transaction 408 (which may include one or both of a requested transaction amount 400 and/or a requested digital currency 404) may be compared to one or more thresholds 416 (which may be applicable to all specific digital currencies, sets or groupings of digital currencies, or not specific to any particular digital currency or currencies).

For example, and by way of a real-world example, a user may request the purchase of (or another transaction relating to) X dollars (e.g., $25) worth of a digital currency (e.g., a cryptocurrency). In such circumstances, the financial institution itself may not typically own or hold the digital currency in question and may be unable or unwilling to own or hold the digital currency for an extended period or in amounts beyond a given tolerance (e.g., risk tolerance). In such circumstances the financial institution may specify one or more thresholds 416 applicable to all digital currencies, individual or specific digital currencies, and/or certain groupings or sets of digital currencies. In this example, the requested $X amount 400 of the requested digital currency 404 corresponds to a requested transaction 408 that can be compared (decision block 412) to one or more thresholds 416 to see if any of the thresholds 416 are applicable in terms of the requested digital currency 404 and the requested amount 400 (e.g., $X). By way of example, in the $25 transaction amount instance, a threshold comparison at decision block 412 may be performed to see if $25 is below the acceptable threshold for digital currency in general on in the context of the specific digital currency being requested.

Turning back to FIG. 9, and with the present example in mind, if the $25 transaction amount exceeds the threshold (or tolerance) for transaction of any digital currency, or the requested digital currency 404 in particular, the transaction is declined (step 420) and the notification 424 of the decline, which may include a reason for declining the transaction, may be provided to the customer, such as via application 162 executing on a user device 108. Alternatively, if the $25 transaction amount is below or at the threshold (or tolerance) for transaction of any digital currency, or the requested digital currency 404 in particular, the transaction may be approved. In one such implementation this may result in the correct amount of the requested digital currency 444 being acquired (step 440) (e.g., based on a specified quantity or an exchange rate), such as from a third-party or market. In the circumstance where the transaction is approved, the digital currency 444 is acquired (step 440) and the transaction completed (step 448). A notification 452 may be provided to the customer that the transaction was completed and/or that the quantity of the requested digital currency 404 has been added to the digital currency wallet 154 of the customer. It may be appreciated that, while the preceding example is presented in the context of a digital currency transaction, the same or a similar process may be equally applicable in other contexts, such as the acquisition of stocks, financial funds, commodities, foreign currencies, and so forth in other financial accounts, such as brokerage accounts, retirement accounts, and so forth.

Figure 10:
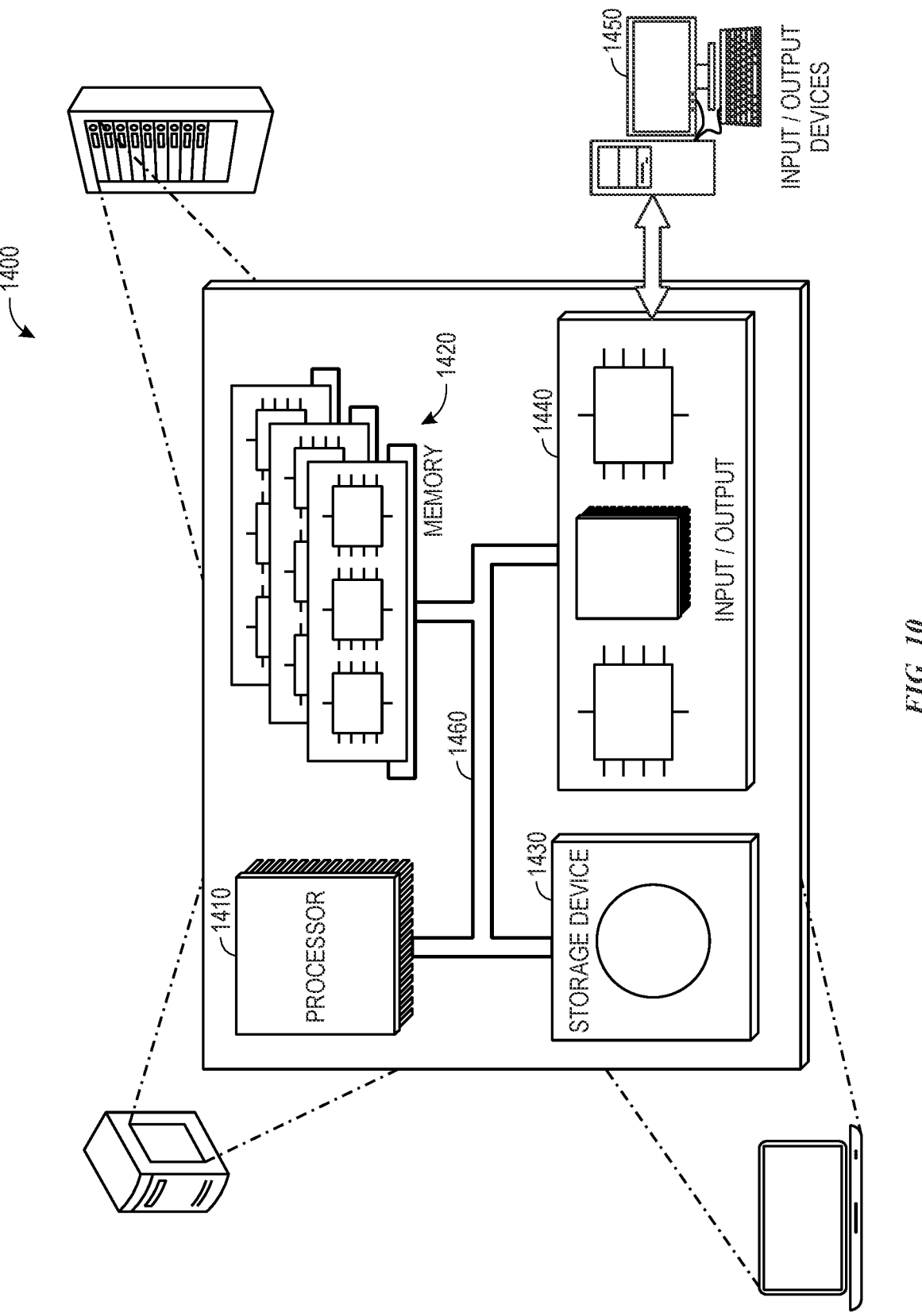
FIG. 10 illustrates an example computing system, in accordance with embodiments described herein.

FIG. 10 illustrates an example computing system 1400 that the embodiments described herein may use to perform their respective operations. The system 1400 may be used for any of the operations described with respect to the various embodiments described herein, including user device(s) 108, digital currency transaction devices 110, a merchant server 114, a financial institution server (e.g., an acquiring bank server) 116, a facilitating server 118, a digital transactions server 102, a computer terminal 106, and so forth. For example, the system 1400 may be included, at least in part, in one or more of the computing device(s) and/or other computing device(s) or system(s) described herein. In certain embodiments, the system 1400 may include one or more processors 1410, one or more memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

In certain embodiments, the processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

In certain embodiments, the memory 1420 may store information within the system 1400. In certain embodiments, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In certain embodiments, the memory 1420 may be employed as active or physical memory by one or more executing software modules.

In certain embodiments, the storage device(s) 1430 may be configured to provide (e.g., persistent) mass storage for the system 1400. In certain embodiments, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a solid-state storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In certain embodiments, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 1410 and the memory 1420 may be supplemented by, or incorporated into, one or more application-specific integrated circuits (ASICs).

In certain embodiments, the system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400 or may be external on one or more computing devices of the system 1400.

In certain embodiments, the system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-832 standard for serial ports, or with a version of the IEEE AA884 standard for parallel ports. As another example, the I/O interface(s) 1440 may be configured to provide a connection over Universal Serial Bus (USB) or Ethernet. In certain embodiments, the I/O interface(s) 1440 may be configured to provide a serial connection that is compliant with a version of the IEEE AA994 standard.

In certain embodiments, the I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random-access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 1400 that includes a back-end component, e.g., as a data server, or that includes a middleware component, e.g., an application server, or that includes a front-end component, e.g., a client computer having a graphical user interface or a web browser through which a user may interact with the system 1400, or any appropriate combination of one or more such back-end, middleware, or front-end components. The components of the system 1400 may be interconnected by any appropriate form or medium of digital data communication, e.g., a communication network. Examples of communication networks include a local area network ("LAN") and a wide area network ("WAN"), e.g., the Internet.

In certain embodiments, the computing system 1400 may include clients and servers. A client and server are generally remote from each other and typically interact through a communication network. The relationship of client and server arises by computer programs running on the respective computers and having a client-server relationship to each other.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

A number of embodiments have been described herein. Nevertheless, it will be understood that various modifications may be made without departing from the spirit and scope of the disclosure. For example, various forms of the flows described herein may be used, with steps re-ordered, added, or removed. Accordingly, other embodiments are within the scope of the following claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function)" or "step for (perform)ing (a function)", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for conducting a digital currency transaction, comprising:

receiving a first indication of a credit debt or loan payment associated with a requested transaction, wherein the credit debt or loan payment comprises a principal component and an interest component;

receiving, as part of the first indication, a selection of a first digital currency in which the principal component shall be paid and a selection of a second digital currency in which the interest component shall be paid, wherein the first digital currency and the second digital currency are different;

receiving from a first party one or both of a second indication of the first digital currency and a first requested amount of the first digital currency, wherein the first digital currency and the first requested amount correspond to the principal component, and wherein the first digital currency comprises a first cryptocurrency;

receiving from the first party one or both of a third indication of the second digital currency and a second requested amount of the second digital currency, wherein the second digital currency and the second requested amount correspond to the interest component, and wherein the second digital currency comprises a second cryptocurrency;

comparing the requested transaction to one or more thresholds;

upon a determination that the requested transaction equals or does not exceed the one or more thresholds, acquiring the first digital currency and the second digital currency from one or more external parties;

completing the requested transaction by transferring the first digital currency in the first requested amount to a digital currency account of the first party and transferring the second digital currency in the second requested amount to the digital currency account of the first party, wherein the digital currency account is maintained for the first party by a financial institution, and wherein the digital currency account is accessed by the first party via an application; and facilitating the credit debt or loan payment using the first digital currency to pay the principal component and the second digital currency to pay the interest component.

2. The method of claim 1, further comprising:

upon an additional determination that the one or more thresholds are exceeded, declining the requested transaction.

3. The method of claim 1, wherein transferring the first requested amount of the first digital currency to the digital currency account of the first party comprises receiving a fourth indication of a quantity of the first digital currency in the digital currency account.

4. The method of claim 1, wherein receiving the first requested amount of the first digital currency from the first party comprises receiving a fourth indication of a quantity of a different currency and converting the quantity of the different currency to the first requested amount of the first digital currency via an exchange rate.

5. The method of claim 1, wherein the one or more thresholds comprise at least one threshold corresponding to a value-based limitation on a quantity of the first digital currency that is allowed to be acquired.

6. A tangible, non-transitory, computer-readable medium, comprising computer-readable instructions that, when executed by one or more processors of a computer, cause the computer to:

receive a first indication of a credit debt or loan payment associated with a requested transaction, wherein the credit debt or loan payment comprises a principal component and an interest component;

receive, as part of the first indication, a selection of a first digital currency in which the principal component shall be paid and a selection of a second digital currency in which the interest component shall be paid, wherein the first digital currency and the second digital currency are different;

receive from a first party one or both of a second indication of the first digital currency and a first requested amount of the first digital currency, wherein the first digital currency and the first requested amount correspond to the principal component, and wherein the first digital currency comprises a first cryptocurrency;

receive from the first party one or both of a third indication of the second digital currency and a second requested amount of the second digital currency, wherein the second digital currency and the second requested amount correspond to the interest component, and wherein the second digital currency comprises a second cryptocurrency;

compare the requested transaction to one or more thresholds;

upon a determination that the requested transaction equals or does not exceed the one or more thresholds, acquire the first digital currency and the second digital currency from one or more external parties;

complete the requested transaction by transferring the first digital currency in the first requested amount to a digital currency account of the first party and transferring the second digital currency in the second requested amount to the digital currency account of the first party, wherein the digital currency account is maintained for the first party by a financial institution, and wherein the digital currency account is accessed by the first party via an application; and facilitate the credit debt or loan payment using the first digital currency to pay the principal component and the second digital currency to pay the interest component.

7. The tangible, non-transitory, computer-readable medium of claim 6, comprising computer-readable instructions that, when executed by the one or more processors of the computer, cause the computer to:

upon an additional determination that the one or more thresholds are exceeded, decline the requested transaction.

8. The tangible, non-transitory, computer-readable medium of claim 6, wherein transferring the first requested amount of the first digital currency from the first party comprises receiving a fourth indication of a quantity of the first digital currency in the digital currency account.

9. The tangible, non-transitory, computer-readable medium of claim 6, wherein receiving the first requested amount of the first digital currency from the first party comprises receiving a fourth indication of a quantity of a different currency and converting the quantity of the different currency to the first requested amount of the first digital currency via an exchange rate.

10. The tangible, non-transitory, computer-readable medium of claim 6, wherein the one or more thresholds comprise at least one threshold corresponding to a value-based limitation on a quantity of the first digital currency that is allowed to be acquired.

11. A system, comprising:

a financial institution server, comprising one or more processors and tangible, non-transitory machine-readable storage mediums comprising machine-readable instructions that, when executed by the one or more processors, cause the financial institution server to:

receive a first indication of a credit debt or loan payment associated with a requested transaction, wherein the credit debt or loan payment comprises a principal component and an interest component;

receive, as part of the first indication, a selection of a first digital currency in which the principal component shall be paid and a selection of a second digital currency in which the interest component shall be paid, wherein the first digital currency and the second digital currency are different;

receive from a first party one or both of a second indication of the first digital currency and a first requested amount of the first digital currency, wherein the first digital currency and the first requested amount correspond to the principal component, and wherein the first digital currency comprises a first cryptocurrency;

receive from the first party one or both of a third indication of the second digital currency and a second requested amount of the second digital currency, wherein the second digital currency and the second requested amount correspond to the interest component, and wherein the second digital currency comprises a second cryptocurrency;

compare the requested transaction to one or more thresholds;

upon a determination that the requested transaction equals or does not exceed the one or more thresholds, acquire the first digital currency and the second digital currency from one or more external parties;

complete the requested transaction by transferring the first digital currency in the first requested amount to a digital currency account of the first party and transferring the second digital currency in the second requested amount to the digital currency account of the first party, wherein the digital currency account is maintained for the first party by a financial institution, and wherein the digital currency account is accessed by the first party via an application; and facilitate the credit debt or loan payment using the first digital currency to pay the principal component and the second digital currency to pay the interest component.

12. The system of claim 11, comprising machine-readable instructions that, when executed by the one or more processors, cause the server to:

upon an additional determination that the one or more thresholds are exceeded, decline the requested transaction.

13. The system of claim 11, wherein transferring the first requested amount of the first digital currency from the first party comprises receiving a fourth indication of a quantity of the first digital currency in the digital currency account.

14. The system of claim 11, wherein receiving the first requested amount of the first digital currency from the first party comprises receiving a fourth indication of a quantity of a different currency and converting the quantity of the different currency to the first requested amount of the first digital currency via an exchange rate.

15. The system of claim 11, wherein the one or more thresholds comprise at least one threshold corresponding to a value-based limitation on a quantity of the first digital currency that is allowed to be acquired.

* * * * *